US010838374B2

(12) United States Patent
Arrowood et al.

(10) Patent No.: US 10,838,374 B2
(45) Date of Patent: *Nov. 17, 2020

(54) AUTOMATICALLY CHANGING ERGONOMIC CONDITIONS

(71) Applicant: International Business Machines Corporation, Armonk, NY (US)

(72) Inventors: Kristin M. Arrowood, Raleigh, NC (US); Clyde T. Foster, Raleigh, NC (US); Joseph N. Kozhaya, Morrisville, NC (US); Douglas A. Williams, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1383 days.

This patent is subject to a terminal disclaimer.

(21) Appl. No.: 14/722,294

(22) Filed: May 27, 2015

(65) Prior Publication Data
US 2016/0334762 A1  Nov. 17, 2016

Related U.S. Application Data

(63) Continuation of application No. 14/713,054, filed on May 15, 2015.

(51) Int. Cl.
*G05B 13/02* (2006.01)
*G06Q 10/06* (2012.01)

(52) U.S. Cl.
CPC ..... *G05B 13/024* (2013.01); *G06Q 10/06312* (2013.01); *G06Q 10/06398* (2013.01); *G06Q 10/063114* (2013.01)

(58) Field of Classification Search
CPC ..... G06Q 10/063114; G06Q 10/06312; G06Q 10/06398; G06B 13/024

(Continued)

(56) References Cited

U.S. PATENT DOCUMENTS 5,676,138 A * 10/1997 Zawilinski ............. A61B 3/113
128/905
5,774,591 A *  6/1998 Black ................. G06K 9/00248
382/118

(Continued)

OTHER PUBLICATIONS

NPL, "A Real-time Ergonomic Monitoring System using the Microsoft Kinect". Proceedings of the 2012 IEEE System and Information Engineering Design Symposium.*

(Continued)

*Primary Examiner* — Minnah L Seoh
*Assistant Examiner* — Debra L Glennie
(74) *Attorney, Agent, or Firm* — Garg Law Firm, PLLC; Rakesh Garg; Jeffrey S LaBaw

(57) ABSTRACT

For automatic operation of an ergonomic equipment according to dynamic workplace conditions, an activity being performed in a workplace by a person at a first time is determined based on an input from a data processing system. A group is selected corresponding to the activity. An ergonomic policy is modified to form a modified ergonomic policy. The ergonomic policy applies to the activity, and the modification is based on a condition existing in the workplace at the first time of the person performing the activity. Independent of a participation of the person, and when the person is not in compliance with the modified ergonomic policy, an ergonomic control is activated. The ergonomic control causes a change in an ergonomic feature of the ergonomic equipment, the change causing the person to become compliant with the modified ergonomic policy.

8 Claims, 5 Drawing Sheets

(58) Field of Classification Search
USPC .......................................................... 705/275
See application file for complete search history.

(56) References Cited

U.S. PATENT DOCUMENTS

| | | | |
|---|---|---|---|
| 7,315,249 B2* | 1/2008 | Littell | A61B 5/103 |
| | | | 340/573.1 |
| 8,024,202 B2 | 9/2011 | Carroll et al. | |
| 8,195,475 B1 | 6/2012 | Landsman et al. | |
| 2004/0195876 A1* | 10/2004 | Huiban | A47C 9/002 |
| | | | 297/217.3 |
| 2005/0284923 A1* | 12/2005 | Elgie | G06F 3/0216 |
| | | | 235/375 |
| 2009/0030767 A1 | 1/2009 | Morris et al. | |
| 2010/0198374 A1* | 8/2010 | Carson | G06Q 10/00 |
| | | | 700/90 |
| 2011/0080290 A1 | 4/2011 | Baxi et al. | |
| 2012/0075483 A1 | 3/2012 | Paoletti | |
| 2013/0052621 A1* | 2/2013 | el Kaliouby | A61B 5/165 |
| | | | 434/236 |
| 2013/0331993 A1 | 12/2013 | Detsch et al. | |

OTHER PUBLICATIONS

NPL, "An exploratory study of detecting emotion states using eye-tracking technology." Science and Information Conference Oct. 7-9, 2013.*
https://bmcmusculoskeletdisord.biomedcentral.com/articles/10.1186/1471-2474-9-105 Agneta Larrson, Lena Karqvist and Gunvor Gard. Jul. 21, 2008 (Year: 2008).*

* cited by examiner

US 10,838,374 B2

AUTOMATICALLY CHANGING ERGONOMIC CONDITIONS

TECHNICAL FIELD

The present invention relates generally to a method for ensuring ergonomically safe and compliant work environment. More particularly, the present invention relates to a method for automatically changing ergonomic conditions.

BACKGROUND

Ergonomics is the applied science of equipment design, such as for a workplace, intended to maximize productivity of the workers by reducing worker fatigue, discomfort, and injury. Ergonomically designed equipment is a physical equipment, such as a chair, a computer monitor platform, or a back-brace, that is designed to provide to a user of the equipment, ergonomically desirable conditions while using the equipment. For example, an ergonomic chair is widely known and used to provide an ergonomically desirable seating to a user by providing ergonomic controls to adjust the height, the seating position, the lumbar support, and other ergonomic features of the chair.

An ergonomic equipment is a physical equipment whose one or more characteristics are adjustable or configurable to provide an ergonomically desirable work environment. Some non-limiting examples of an ergonomic equipment include a task chair, a monitor pedestal, an adjustable surface for positioning a computer keyboard on a desk, or a bracing belt or similar wearable device for supporting the back or another part of the human body. An ergonomic equipment can also be an equipment that aids in providing an ergonomically desirable work environment, such as a ramp, a heating ventilation and air conditioning (HVAC) system, and the like.

An ergonomic feature is an aspect of the ergonomic equipment, which can be controlled and manipulated to cause a change in a characteristic of the ergonomic equipment. Some non-limiting examples of ergonomic features include, a thickness of a lumbar section of a task chair, a height of a monitor pedestal, a height or depth of an adjustable keyboard surface on a desk, or a stiffness of a bracing belt or another wearable device. An ergonomic feature can also include an inclination of a ramp, or a temperature or ventilation setting of an HVAC system, and the like.

An ergonomic control is a control apparatus designed to adjust an ergonomic feature of a physical equipment. Some non-limiting examples of ergonomic features include, an apparatus to adjust a thickness of a lumbar section of a task chair, an apparatus to adjust a height of a monitor pedestal, an apparatus to adjust a height or depth of an adjustable keyboard surface on a desk, or an apparatus to adjust a stiffness of a bracing belt or another wearable device. An ergonomic control can also include an apparatus to adjust an inclination of a ramp, or an apparatus to adjust a temperature or ventilation setting of an HVAC system, and the like.

SUMMARY

The illustrative embodiments provide a method for automatically changing ergonomic conditions. An embodiment includes a method for automatic operation of an ergonomic equipment according to dynamic workplace conditions. The embodiment determines, using a processor and a memory, based on an input from a data processing system, an activity being performed in a workplace by a person at a first time. The embodiment selects a group corresponding to the activity. The embodiment modifies an ergonomic policy to form a modified ergonomic policy, where the ergonomic policy applies to the activity, and where the modifying is based on a condition existing in the workplace at the first time of the person performing the activity. The embodiment activates, independent of a participation of the person, an ergonomic control, and responsive to the person not being in compliance with the modified ergonomic policy, wherein the ergonomic control causes a change in an ergonomic feature of the ergonomic equipment, the change causing the person to become compliant with the modified ergonomic policy.

Another embodiment includes a computer usable program product comprising a computer readable storage device including computer usable code for automatic operation of an ergonomic equipment according to dynamic workplace conditions.

Another embodiment includes a data processing system for automatic operation of an ergonomic equipment according to dynamic workplace conditions.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
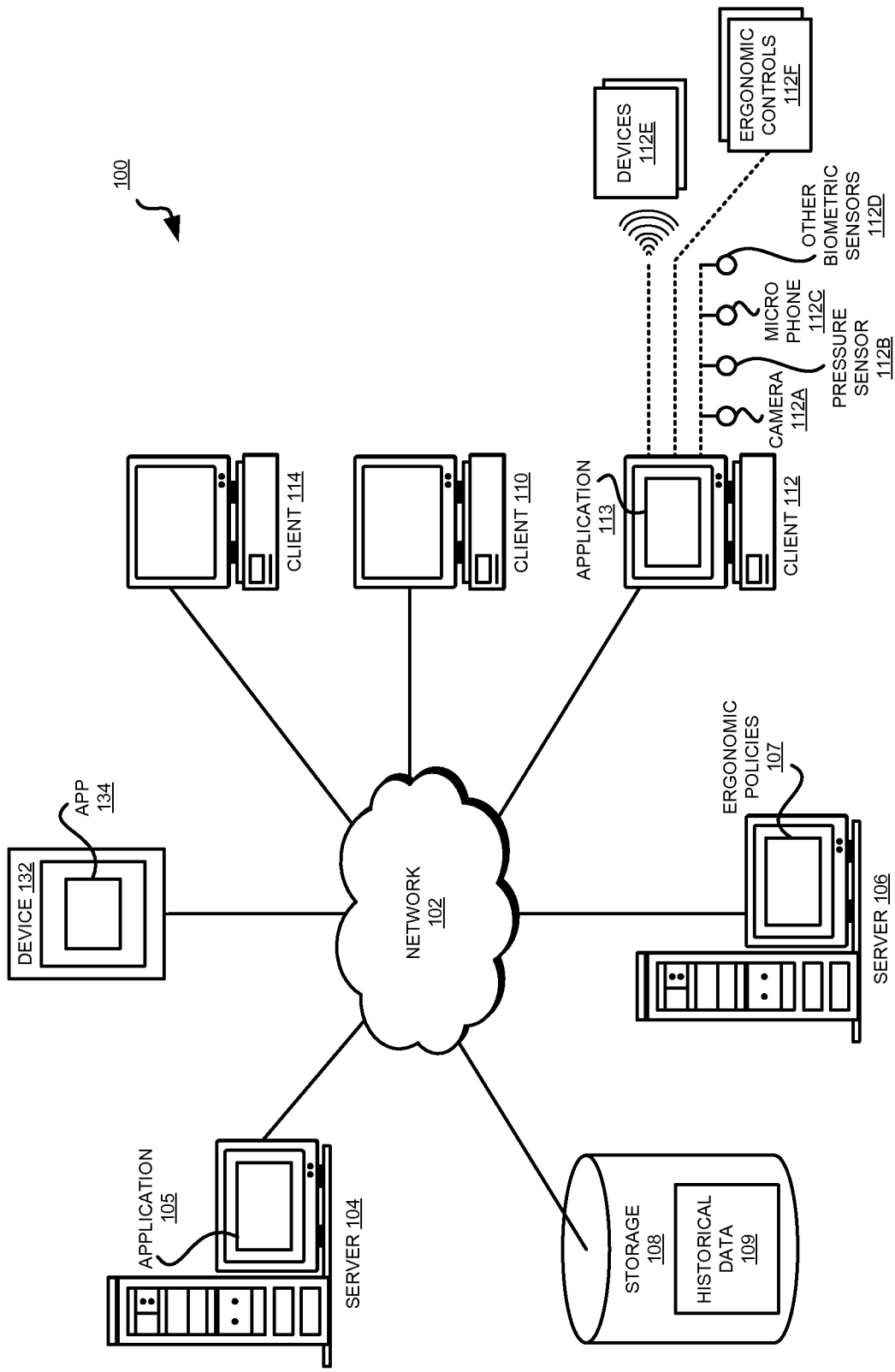
FIG. 1 depicts a block diagram of a network of data processing systems in which illustrative embodiments may be implemented.

A workplace can include several groups of people performing different functions. For example, a software manufacturer may include a group of individuals who perform coding or data entry tasks on computers, another group of individuals who perform managerial tasks, and so on.

The illustrative embodiments recognize that ergonomic features needed to perform the different tasks, such as by different groups of people, are different. For example, a programmer in a group of programmers is likely conditioned to sitting and operating a computer for longer periods of time as compared to a manager in a group of manager. Accordingly, a programmer might need longer or frequent breaks to stand up from a chair, look away from the computer, or both, as compared to a manager.

An ergonomic policy is a rule or logic designed to enforce ergonomic conditions in the workplace. An ergonomic condition includes not only the use of ergonomic equipment as intended but also to perform or not perform certain acts or operations in the workplace. As some non-limiting examples, one example ergonomic policy may enforce the use of an ergonomically suitable task chair for the tasks performed by a programmer. Another example ergonomic policy may require the programmer to take a break after sitting and coding for thirty minutes for a duration of at least five minutes.

The illustrative embodiments further recognize that ergonomic features needed by different individuals for performing similar tasks are also different. For example, a physically fit programmer, who runs five miles every morning, may need fewer breaks between coding sessions or a softer lumbar support than another programmer who is not as fit.

The illustrative embodiments further recognize that ergonomic features needed by the same individual for performing similar tasks at different times can also different. For example, a programmer may need fewer breaks between coding sessions or warmer temperature in his or her office on a day when the programmer is emotionally happy, as compared to another day when the programmer is emotionally stressed.

As described via some non-limiting examples above, the ergonomic features needed by a person to create an ergonomically desirable workplace are dynamic, i.e., they change from group to group, individual to individual, and from time to time. The illustrative embodiments recognize that presently, ergonomic policies and other ergonomic accommodations in the workplace are unable to identify or satisfy such dynamically occurring differences in the ergonomic needs in the workplace.

The illustrative embodiments used to describe the invention generally address and solve the above-described problems and other problems related to maintaining an ergonomically desirable workplace. The illustrative embodiments provide a method for automatically changing ergonomic conditions.

An embodiment receives one or more inputs from one or more sensors in the workplace. Using a sensor input, the embodiment determines a physical state of a person, an emotional state of the person, or an activity being performed by the person.

A sensor can be any electrical, mechanical, electromechanical, electronic, or transducer-based device. A sensor is configured to detect a signal or an event. For example, a camera is a type of sensor that detects visually perceptible events, a microphone is a type of sensor that detects audibly perceptible events, a pressure sensor is a type of sensor that detects changes in applied pressures, and a strain gauge is a type of sensor that detects changes in mechanical strain or stress.

As some more examples, biometric sensors are sensors that detect, measure, or analyze various biometric features of a human. For example, one type of biometric sensor can detect the physical health of a person by analyzing the sweat of the person. Such a sensor can be mounted on a computer mouse and can detect from the palm sweat of the person operating the mouse whether the person is stressed, suffers from an ailment, or is taking certain medications.

Another type of biometric sensor can detect the emotional state of a person by detecting eye-movements or the retina-image of the person. Such a sensor can be suitably mounted to observe a person's eyes and can detect whether the person is emotionally stressed, disturbed, restless, calm, or happy.

Another type of sensor or biometric sensor can detect whether the person is exerting strain or torsion on the person's back. Such a sensor can be suitably mounted, such as in a back-brace or a lumbar support of a chair, to observe muscle movements in the person's back.

These examples of the sensors are not intended to be limiting. From this disclosure, those of ordinary skill in the art will be able to conceive many other sensors and their operation in conjunction with an embodiment, and the same are contemplated within the scope of the illustrative embodiments.

An embodiment receives one or more inputs from a computer system in the workplace. Using a system input, the embodiment determines a physical state of a person, an emotional state of the person, or an activity being performed by the person.

For example, a computer system being used by a programmer provides, as input to an embodiment, a list of active processes currently receiving the focus from the programmer. The embodiment uses the input to determine whether the programmer is coding, watching a video, or not paying attention to the computer monitor.

Optionally, an embodiment can also receive a user profile of a person. The profile can include information such as, but not limited to, height, weight, physical limitations, disabilities, current medications, or physical or emotional stressors applicable to the person.

Many applications (apps) are available for mobile devices to track a person's fitness, health, emotional states, and the like. Optionally, an embodiment can also receive information about a person's fitness, health, ailments, medications, diet, emotional state, or some combination thereof, from an app executing in a mobile system and reachable over a data network.

Using some combination of an input from a sensor, an input from a system, and one or more profiles, an embodiment determines a present physical state and a present emotional state of a person. An embodiment also determines a group where the person fits according to the inputs. For example, in one embodiment, a profile can also provide information about a group to which the person belongs, such as by defining a role of the person in the workplace.

In another embodiment, using the example of a programmer group and a manager group in an example workplace, the embodiment determines a length of time the person has spent using the computer, and determines whether the person fits the programmer group more than the person fits the manager group. Note that such grouping can be dynamic. For example, there can be days when the person behaves like a programmer by spending more than a threshold amount of time using the computer, and the programmer group and the corresponding ergonomics apply to the person. On some other days, the same person spends less than the threshold amount of time using the computer, and the person fits the manager group better on such days. Accordingly, on such days, the ergonomic conditions applicable to the manager group are better suited for the person.

An embodiment further receives historical data of ergonomic features used by a group, historical data of ergonomic features used by a person, or both. The historical data of ergonomic features used by a group describes conditions needed to place a person in the group—for example, an amount of time spent over a period using the computer. The historical data of ergonomic features used by a group describes an ergonomic feature, or a setting thereof, of an ergonomic equipment, used by the group under a given set of circumstances.

Using the historical data, the embodiment determines the ergonomic features and/or ergonomic policies that best fit the present grouping applicable to the person, the present physical state of the person, the present emotional state of the person, or some combination thereof. "Best fit" is the process of determining whether a match between two values exceeds a threshold degree of match.

For example, if the person is operating like a person who belongs in the programmer group, then the embodiment selects a subset of ergonomic policies from a set of ergonomic policies. As an example, assume that a policy in the selected subset applies to the programmer group and requires certain lighting conditions in the workspace and a certain break duration after a certain work duration. An embodiment modifies the example policy according to the person's present personal state and/or emotional state, to determine compliance with the policy or to cause a change in an ergonomic equipment in the workplace.

For example, the present physical state of the person, as determined from one or more inputs to an embodiment, may indicate to the embodiment that the person has exceeded the work duration without the required break, but the person is actually relaxing watching a video, not coding. Accordingly, the embodiment modifies the policy to not require the break at the present time, and deems the person to be in compliance with the modified policy. Optionally, the embodiment can store the modified policy and a combination of the group information, the physical state information of the person, the emotional state information of the person, a setting of an ergonomic feature, and the like, in a group historical data repository, a personal historical data repository, or both.

As another example, the present emotional state of the person, as determined from one or more inputs to an embodiment, may indicate to the embodiment that the person is straining his or her eyes to view the screen. Accordingly, the embodiment sends a command to the window blinds or the lighting fixture in the workspace—some more examples of ergonomic equipment—to cause a change in the light intensity in the present workspace of the person.

A method of an embodiment described herein, when implemented to execute on a device or data processing system, comprises substantial advancement of the functionality of that device or data processing system in creating or maintaining an ergonomically desirable workplace. For example, prior-art ergonomics in the workplace are unable to automatically detect a dynamically changing personal condition or a dynamically changing workplace condition. The prior art ergonomics in the workplace is also unable to automatically and dynamically cause the changes in the workplace to create an ergonomically desirable workplace according to those dynamically occurring conditions. An embodiment continuously and automatically monitors and detects the dynamically occurring conditions in the workplace. An embodiment further, automatically and dynamically adjusts an ergonomic policy, manipulates an ergonomic equipment, or both. Operating in a manner described herein, an embodiment creates or maintains an ergonomically desirable workplace under the dynamic conditions. Such manner of detecting and satisfying the dynamically changing ergonomic needs in a workplace is unavailable in presently available devices or data processing systems. Thus, a substantial advancement of such devices or data processing systems by executing a method of an embodiment improves the compliance with ergonomic policies, and flexibly manages ergonomically desirable conditions in the workplace.

The illustrative embodiments are described with respect to certain equipment, sensors, features, controls, policies, conditions, operations, physical states, emotional states, groups, tasks, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
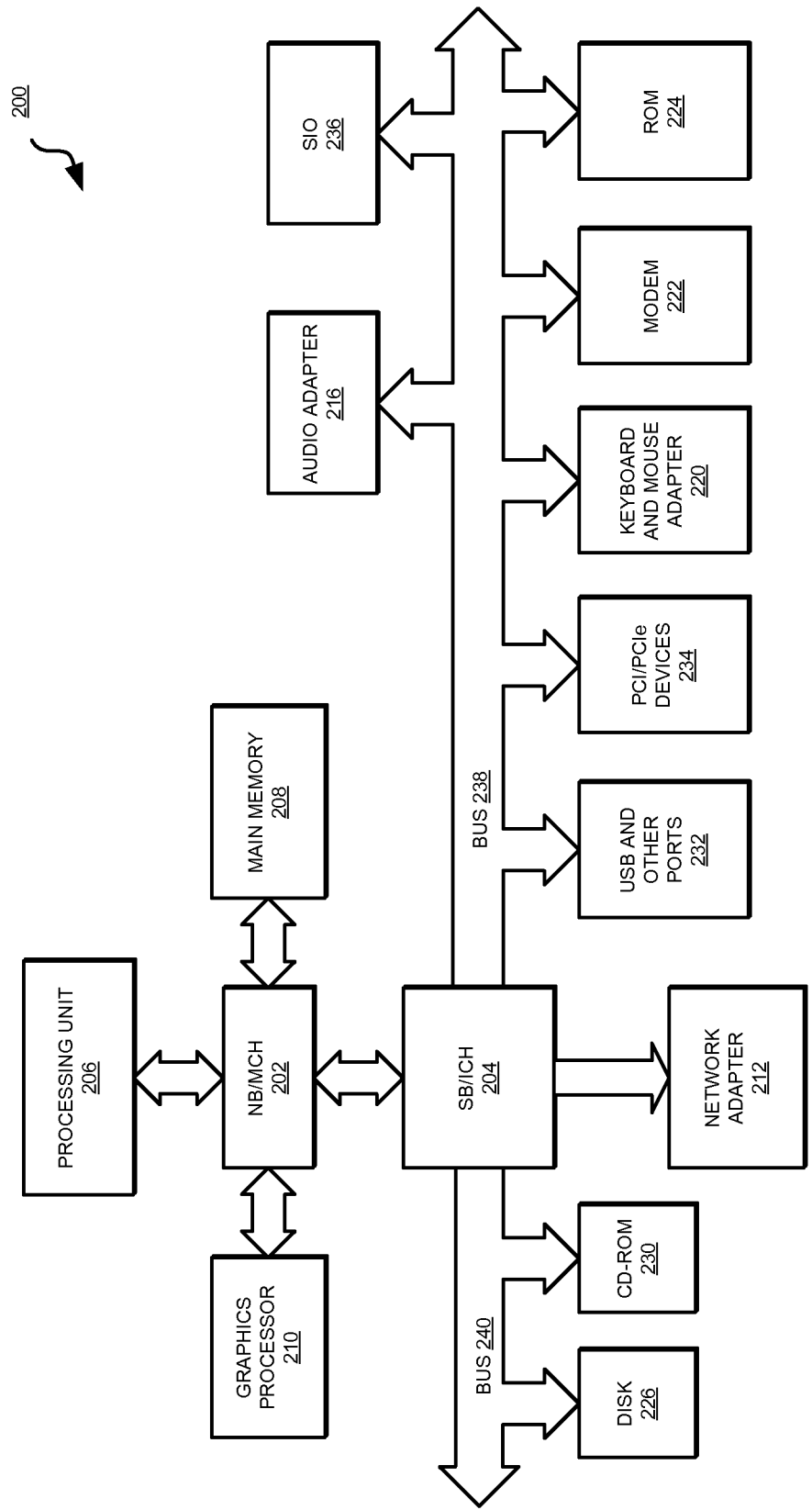
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. An embodiment described herein can be implemented in any data processing system, such as in the form of application 105 in server 104 or application 113 in client 112. An embodiment, such as in application 113, receives information from app 134, historical data 109, and ergonomic policies 107 as described herein. Devices 112E can be other wearable devices, such as back-braces, wristbands, watch-type wearable device, remote sensing dock-side device, and the like, that can communicate with application 113 over a wireline or wireless data connection and receive information from or provide information to application 113. Sensors, such as non-limiting example camera 112A, pressure sensor 112B, microphone 112C, and biometric sensor 112D, provide inputs to application 113 as described herein. Application 113 sends commands to, or otherwise causes operations to occur at ergonomic controls 112F, to cause a change in a workplace in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows° (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 or application 113 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
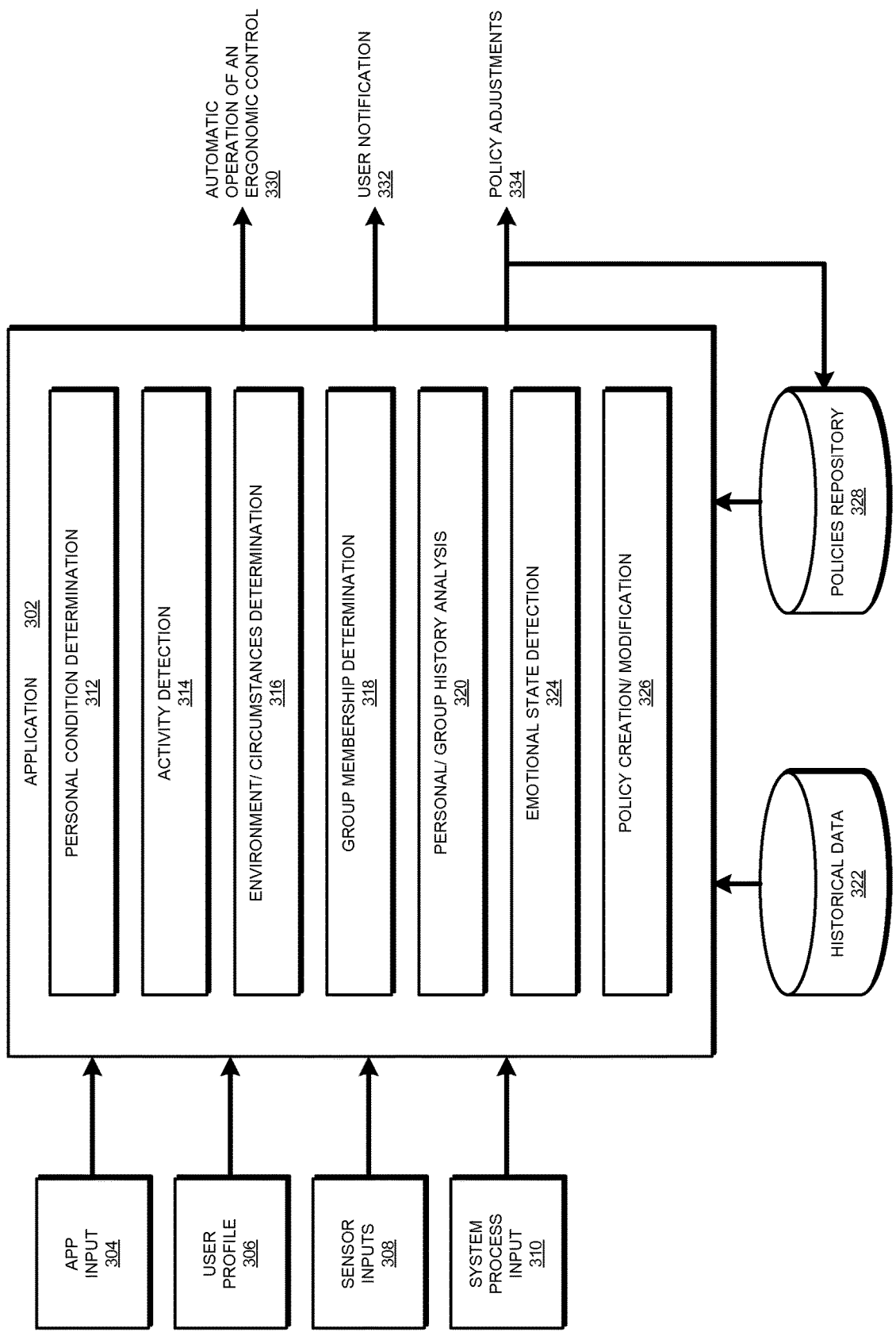
FIG. 3 depicts a block diagram of an example configuration for automatically changing ergonomic conditions in accordance with an illustrative embodiment.

With reference to FIG. 3, this figure depicts a block diagram of an example configuration for automatically changing ergonomic conditions in accordance with an illustrative embodiment. Application 302 is an example of application 105 or 113 in FIG. 1.

Application 302 optionally receives app input 304. App input 304 may be from app 134 in FIG. 1, which may be a fitness tracking app, a diet tracking app, a physical or emotional health tracking app, or some combination thereof.

Application 302 optionally receives user profile input 306. The user profile information in input 306 may be from a user profile created by or for a person whose dynamic ergonomic needs are to be addressed using application 302.

Application 302 receives one or more sensor inputs 308. Sensor input 308 may be from any combination of any types of sensors that are usable for determining a condition of the person.

Application 302 receives one or more system inputs 310. System input 310 may take any suitable form, including but not limited to information about processes executing on a data processing system at a given time or information about a process that is receiving focus in the data processing system at a given time. System input 310 is usable for determining a condition of the person, a compliance with an ergonomic policy, or both.

Component 312 in application 302 determines a person's condition using one or more of inputs 304, 306, 308, and 310. Such conditions include but are not limited to known health problems, disabilities or limitations, known ergonomic preferences, and the like, about a person whose dynamic ergonomic needs are to be accommodated using application 302.

Component 314 detects an activity that the person is engaged in at the time of an input in inputs 304, 306, 308, and 310. For example, the person may be coding on a computer.

Component 316 determines the workplace environment related ergonomic factors, the circumstances existing at the time of an input in inputs 304, 306, 308, and 310, or both. For example, workplace environment related ergonomic factor at a given time may be an ambient temperature or ambient light. Example circumstances existing at the time may be cloudy weather, broken-down HVAC system, the settings on various ergonomic equipments, a project deadline (causing the person to spend extended hours coding under time-pressure), and the like.

Based on the activity in which the person is involved at the given time, the circumstances existing at that time, or a combination thereof, component 318 determines a group in which the person fits at the given time. Note that the group determined by component 318 may be different from a group or role normally assigned to the person in the workplace, as described elsewhere in this disclosure.

Component 320 obtains personal ergonomic historical data about the person, group ergonomic historical data about the determined group, or both, from historical data repository 322. Component 320 analyzes the received historical data to determine ergonomic features or settings therefor that would make the workplace ergonomically desirable to the person for the activity, under the personal conditions and circumstances of the activity.

Component 324 also detects the person's emotional state using one or more of inputs 304, 306, 308, and 310. Component 320 can additionally use the emotional state detected at the time in the analysis of the historical data.

Component 326 selects from repository 328 of ergonomic policies, one or more ergonomic policies that apply to the person or the determined group. Component 326 further creates a new ergonomic policy or modifies an existing ergonomic policy from the selected policies, such that the policy corresponds to the physical and emotional state of the person at the given time under the circumstances at the given time.

Based on the analysis based on the present physical state, the present emotions state, the analysis of the historical data, the created or modified ergonomic policy, or a combination thereof, application 302 outputs one or more outputs. For example, if the present physical state, the present emotions state, the analysis of the historical data, the created or modified ergonomic policy, or a combination thereof, suggests that a setting of an ergonomic feature should be changed, application 302 produces output 330, which commands or otherwise causes an automatic operation—without the intervention of the person—of an ergonomic control associated with an ergonomic equipment. For example, application 302 may cause a height to increase or a lumbar support to firm up in a chair, shades to be drawn or raised on a window, the ambient temperature to be raised or lowered via an HVAC system, lights to be brightened or dimmed in a light fixture, a tactile feedback to be provided in a wearable device, and many other such operations.

Alternatively, or together with output 330, if the present physical state, the present emotions state, the analysis of the historical data, the created or modified ergonomic policy, or a combination thereof, suggests that the person remains in violation of an existing, new, or modified ergonomic policy, application 302 produces output 332, which notifies the person to take an action to become compliant. For example, a notification may be presented on a computer screen, or a tactile or audible feedback may be provided to the person, informing the person about the ergonomic policy violation and a recommended course of action to become complaint with the policy.

Alternatively, or together with outputs 330 and/or 332, if a new policy is created, or an existing policy is modified by application 302, application 302 produces the new or modified ergonomic policy as output 334. In one embodiment, application 302 saves the modified or created ergonomic policy of output 334 in repository 328.

Figure 4:
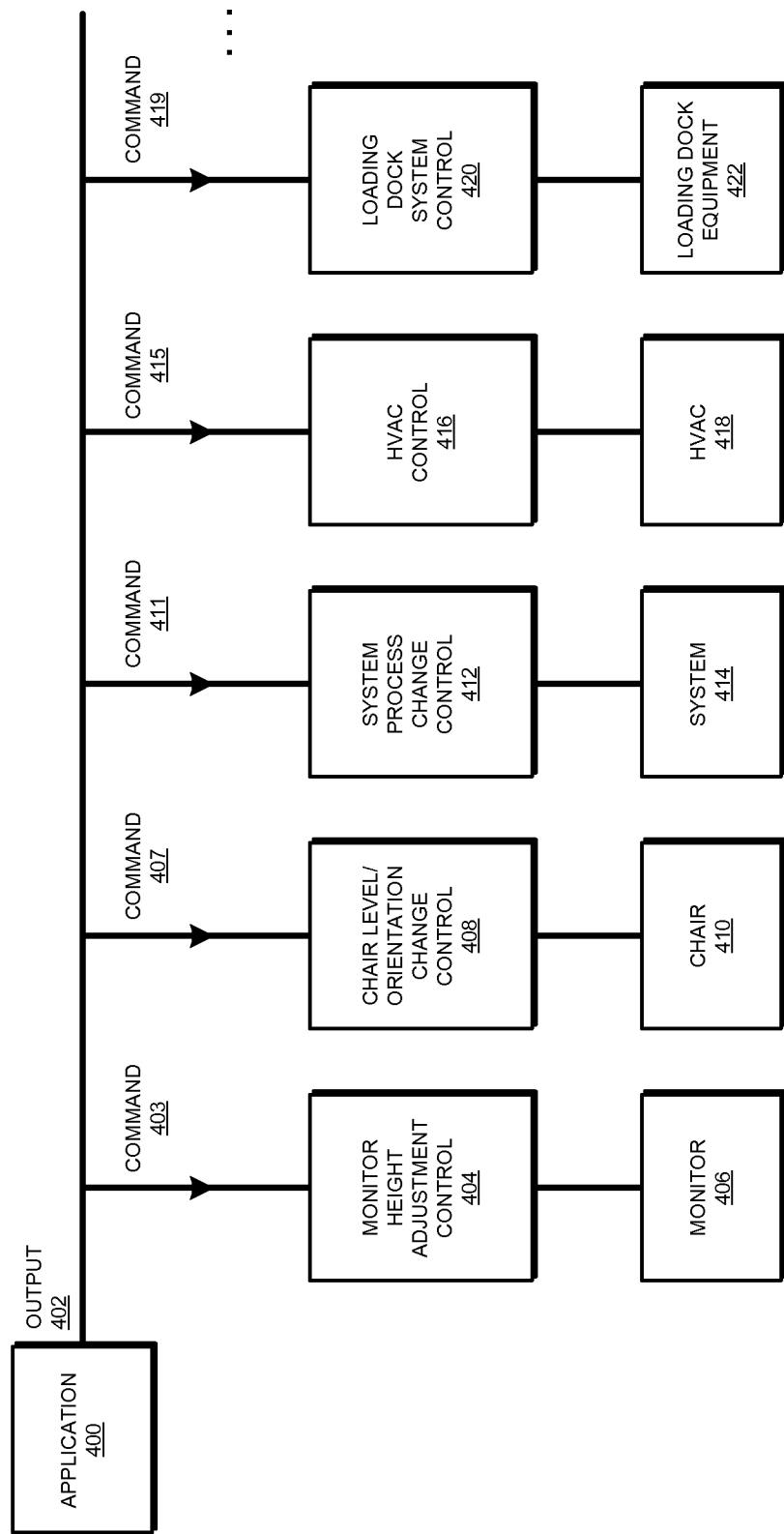
FIG. 4 depicts a block diagram of the automatic operation of some example ergonomic controls in accordance with an illustrative embodiment.

With reference to FIG. 4, this figure depicts a block diagram of the automatic operation of some example ergonomic controls in accordance with an illustrative embodiment. Application 400 is an example of application 302 in FIG. 3. Output 402 is an example of output 330 in FIG. 3.

Output 402 can communicate or cause one or more of example commands 403, 407, 411, 415, 419, or other similarly purposed commands for corresponding ergonomic controls that control their respective ergonomic equipment.

For example, assume that output 402 provides command 403, or causes command 403 to be provided to example ergonomic control 404. Example ergonomic control 404 is an automatic monitor height adjustment control, which causes a position of ergonomic equipment—monitor 406—to be changed.

As another example, assume that output 402 provides command 407, or causes command 407 to be provided to example ergonomic control 408. Example ergonomic control 408 is an automatic chair level or orientation control, which causes a position of ergonomic equipment—chair 410—to be changed.

As another example, assume that output 402 provides command 411, or causes command 411 to be provided to example ergonomic control 412. Example ergonomic control 412 is an automatic system process change control, which causes an ergonomic equipment—computer system 414—to change the state of a process executing thereon. For example, a coding application process may be paused or minimized, a notification may be displayed, or both, to indicate that the programmer should take a break from coding.

As another example, assume that output 402 provides command 415, or causes command 415 to be provided to example ergonomic control 416. Example ergonomic control 416 is an automatic HVAC control, which causes an operation of ergonomic equipment—HVAC system 418—to be changed.

As another example, assume that output 402 provides command 419, or causes command 419 to be provided to example ergonomic control 420. Example ergonomic control 420 is an automatic loading dock system control, which causes an operation of an ergonomic equipment—loading dock equipment 422—to be changed. For example, an audible or tactile feedback to a dock worker may be presented on a handheld dock system, a fork lift may be slowed, and the like, to indicate that the dock worker should take a break.

Figure 5:
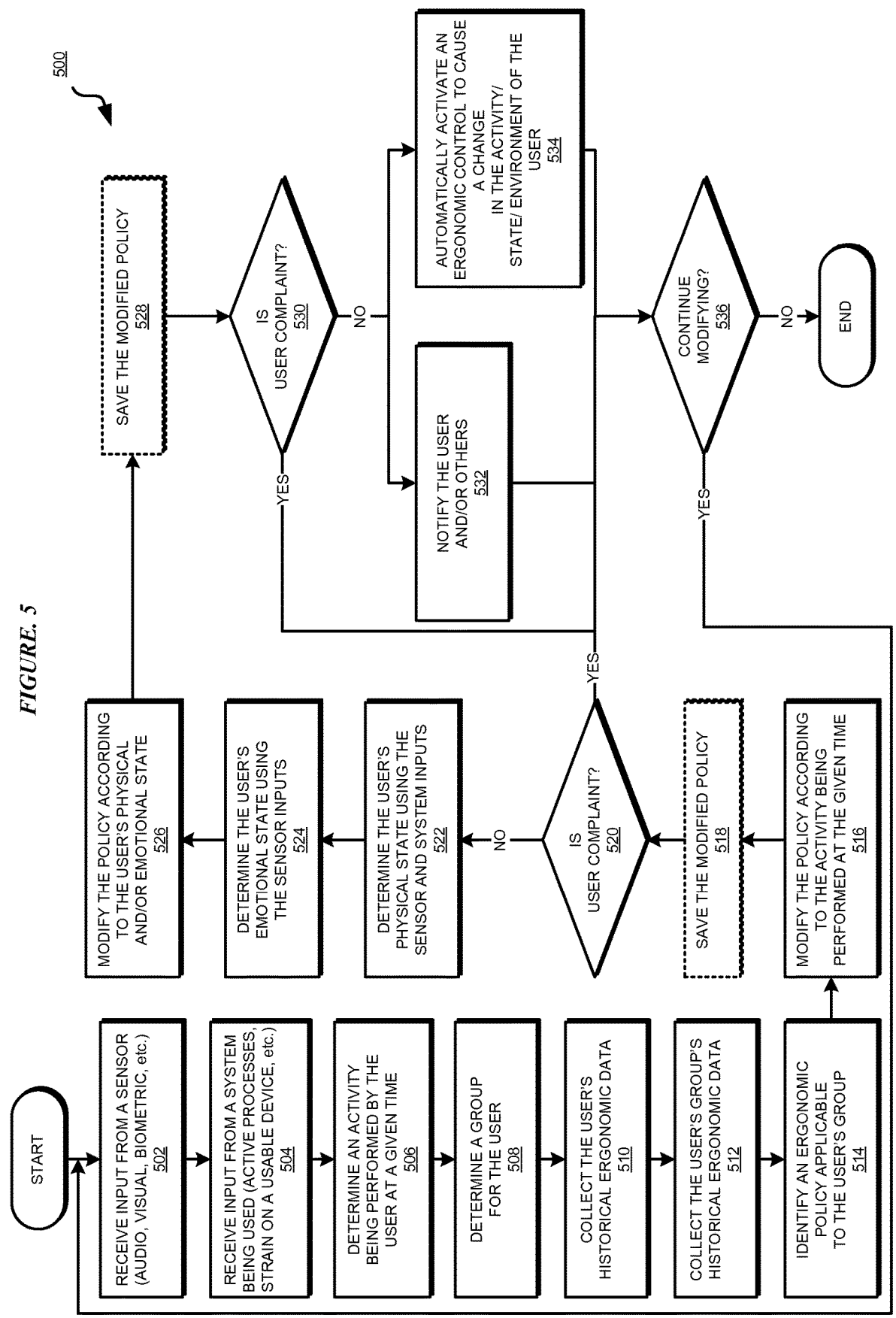
FIG. 5 depicts a flowchart of an example process for automatically changing ergonomic conditions in accordance with an illustrative embodiment.

With reference to FIG. 5, this figure depicts a flowchart of an example process for automatically changing ergonomic conditions in accordance with an illustrative embodiment. Process 500 can be implemented in application 302 in FIG. 3.

The application receives one or more inputs from a sensor (block 502). For example, the application may receive audio, visual, or biometric input in block 502.

The application receives an input from a system that is being used by a person whose dynamic ergonomic needs are to be accommodated using process 500 (block 504). For example, the application may receive a list of active processes receiving focus on a data processing system, or a strain value from a wearable device in block 504.

The application determines an activity the person is performing at a given time, such as at the time of the input in block 502, 504, or both (block 506). The application determines a group in which the person belongs according to the activity (block 508).

The application collects the historical ergonomic data of the person (block 510). The application collects the historical ergonomic data of the group determined in block 508 (block 512). The application uses the group determined in block 508, the data received in block 510, the data received in block 512, or a combination thereof, to identify an ergonomic policy that is applicable to the group (block 514).

The application modifies the selected policy according to the activity determined in block 506 (block 516). Optionally, the application saves the modified policy (block 518).

The application determines whether the person is in compliance with the modified policy (block 520). If the person is in compliance ("Yes" path of block 520), the application progresses process 500 to block 536.

If the person is not in compliance ("No" path of block 520), the application determines the person's physical state using the inputs received in block 502, 504, or both (block 522). The application determines the person's emotional state using the inputs received in block 502, 504, or both (block 524).

The application modifies the policy according to the person's physical state, emotional state, or both (block 526). Optionally, the application saves the modified policy for use under similar conditions with the same or different person (block 528). The application determines whether the person is complaint with the modified policy (block 530). If the person is in compliance ("Yes" path of block 530), the application progresses process 500 to block 536.

If the person is not in compliance ("No" path of block 520), the application performs the operation of block 532, the operation of block 534, or both. For example, the application notifies the person, and any number of other individuals as may be configured (block 532). Alternatively, or together with the operation of block 532, the application automatically activates an ergonomic control, or causes the control to be activated, to cause a change in the activity, a state of the person, a workplace environment of the person, or some combination thereof (block 534).

The application determines whether to continue monitoring the workplace and the person in this manner (block 536). If the monitoring should continue ("Yes" path of block 536), the application returns process 500 to block 502. If the monitoring should not continue ("No" path of block 536), the application ends process 500 thereafter.

Thus, a computer implemented method is provided in the illustrative embodiments for automatically changing ergonomic conditions. Where an embodiment or a portion thereof is described with respect to a type of device, the computer implemented method, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automatic operation of an ergonomic equipment according to dynamic workplace conditions, the method comprising:

determining, using a processor and a memory, based on an input from a data processing system, an activity being performed in a workplace by a person at a first time;

selecting a group corresponding to the activity, the group defining a role of the person in the workplace, wherein selecting the group is based upon a length of time the person has performed the activity and historical data of the group associated with the activity;

modifying an ergonomic policy to form a modified ergonomic policy, wherein the ergonomic policy applies to the activity, and wherein the modifying is based on a condition existing in the workplace at the first time of the person performing the activity and the selected group; and activating, independent of a participation of the person, an ergonomic control, and responsive to the person not being in compliance with the modified ergonomic policy, wherein the ergonomic control causes a change in an ergonomic feature of the ergonomic equipment, the change causing the person to become compliant with the modified ergonomic policy.

2. The method of claim 1, further comprising:

receiving, from a sensor, a sensor input;

determining, using the sensor input, a physical state of the person at the first time of performing the activity;

modifying, to form a second modified ergonomic policy, the ergonomic policy according to the physical state of the person at the first time; and determining that the person is not in compliance with the second modified ergonomic policy at the first time;

notifying the person that the person is not in compliance with the second modified ergonomic policy at the first time; and activating, independent of the participation of the person, a second ergonomic control, wherein the second ergonomic control causes a second change in an ergonomic feature of a second ergonomic equipment, the second change causing the person to become compliant with the second modified ergonomic policy at the first time.

3. The method of claim 1, further comprising:

receiving, from a sensor, a sensor input;

determining, using the sensor input, an emotional state of the person at the first time of performing the activity;

modifying, to form a second modified ergonomic policy, the ergonomic policy according to the emotional state of the person at the first time; and determining that the person is not in compliance with the second modified ergonomic policy at the first time; and notifying the person that the person is not in compliance with the second modified ergonomic policy at the first time.

4. The method of claim 1, further comprising:

determining that the activity is being performed in the workplace by the person at a second time;

changing a second ergonomic policy to form a second modified ergonomic policy, wherein the changing is based on a second condition existing in the workplace at the second time;

activating, independent of a participation of the person, a second ergonomic control, and responsive to the person not being in compliance with the second modified ergonomic policy, wherein the second ergonomic control causes a second change in an ergonomic feature of a second ergonomic equipment, the second change causing the person to become compliant with the second modified ergonomic policy.

5. The method of claim 1, further comprising:

determining that the person is performing a second activity in the workplace at a second time;

changing a second ergonomic policy to form a second modified ergonomic policy, wherein the changing is based on a second condition existing in the workplace at the second time;

activating, independent of a participation of the person, a second ergonomic control, and responsive to the person not being in compliance with the second modified ergonomic policy, wherein the second ergonomic policy applies to the second activity, wherein the second ergonomic control causes a second change in an ergonomic feature of a second ergonomic equipment, the second change causing the person to become compliant with the second modified ergonomic policy.

6. The method of claim 1, further comprising:

determining whether the person is in compliance with the modified ergonomic policy at the first time.

7. The method of claim 1, wherein the group is distinct from a second group to which the person is assigned in the workplace.

8. The method of claim 1, further comprising:

receiving the input from the data processing system, and wherein the input comprises information of a process executing in the data processing system; and determining that the person is interacting with the process in the data processing system to perform the activity at the first time.

* * * * *